Oct. 23, 1956   M. MOONEY   2,767,432
APPARATUS FOR CONVEYING EXTRUDED STOCK
Filed May 24, 1952
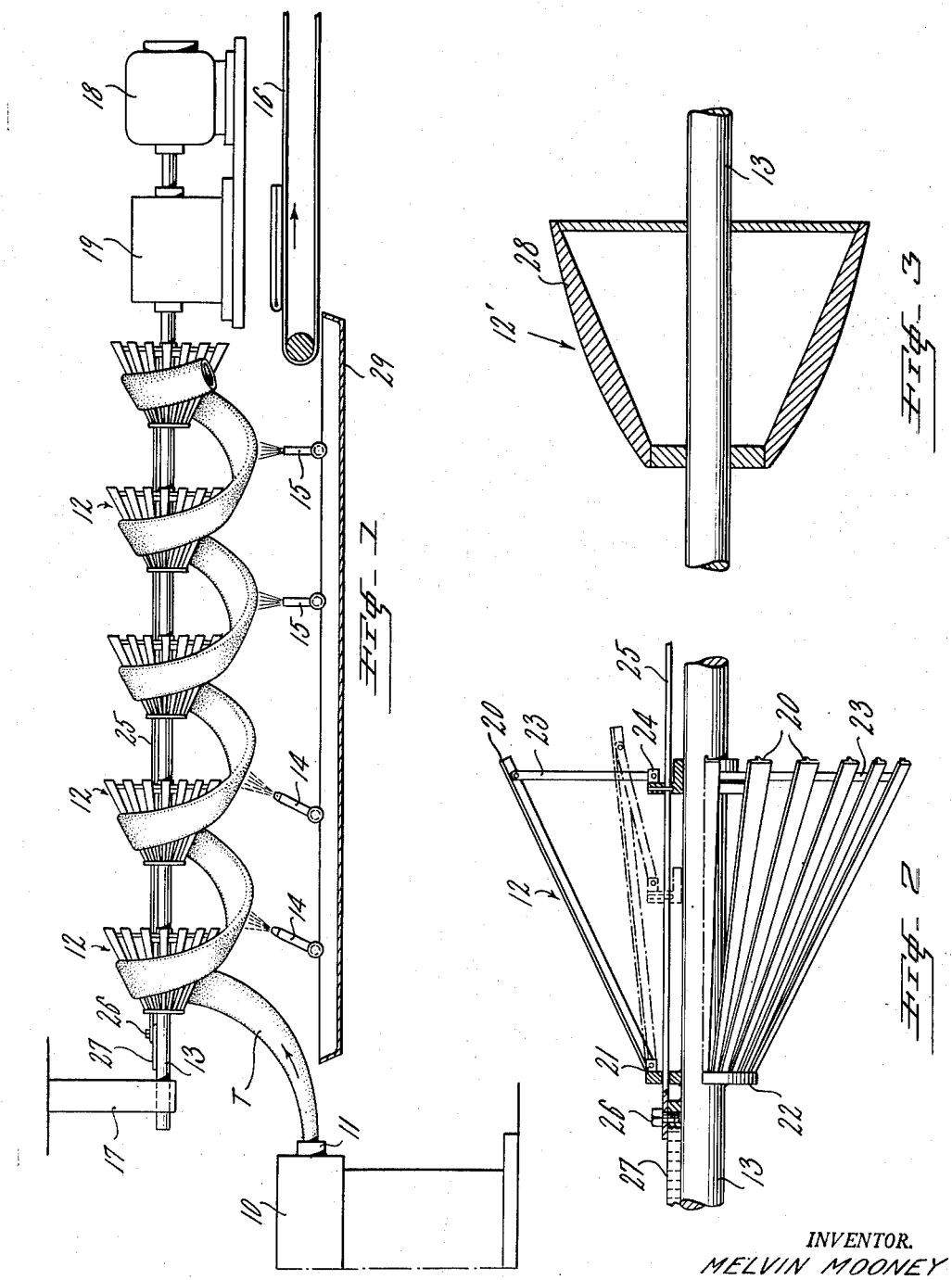
INVENTOR.
MELVIN MOONEY
BY
Charles C. Willson
ATTORNEY

United States Patent Office 2,767,432
Patented Oct. 23, 1956

2,767,432

APPARATUS FOR CONVEYING EXTRUDED STOCK

Melvin Mooney, Mountain Lakes, N. J., assignor to United States Rubber Company, New York, N. Y., a corporation of New Jersey Application May 24, 1952, Serial No. 289,775

6 Claims. (Cl. 18—14)

This invention relates to apparatus for manufacturing inner tubes for pneumatic tires and more particularly to means for extruding and conveying inner tube stock so that it is given an arcuate shape when in a plastic condition and is maintained in this arcuate shape while the stock is transported from the extruder and cooled.

In the conventional method of manufacturing inner tubes, tube stock having a circular cross section is continuously extruded; this tube stock is allowed to collapse so that it may be transported conveniently to cooling apparatus where the stock is cooled. After the stock is cooled, proper lengths are cut, and their ends are spliced to form a completed annulus.

Prior to vulcanization of the inner tube, it is necessary to inflate this annulus to substantially its normal vulcanized shape. Heretofore, it had been the practice to extrude the tube stock in a continuous straight length, with the result that when this stock was spliced and inflated to form an annulus, a wide differential occurred in the perimeters of the inner tube at the rim and tread circumferences. This differential resulted in inner tubes having a relatively thinner wall in the tread region, which in turn led to premature failure of the tubes.

In Patent 2,423,147 to Hinman there is disclosed a method and apparatus for manufacturing inner tubes which eliminates this objectionable thinning-out of the inner tube in the tread region. In Hinman's apparatus the extruded tube stock in arcuate shape is led upwardly from the extruder die to a conical roller and thence is conveyed over a series of additional rollers between which it travels in arcuate reaches and is cooled. In this manner the tube stock retains its arcuate shape throughout the cooling process. The amount of rubber extruded in the tread circumference may be varied by a nice adjustment of the position of the die plug in the extruder to form a properly curved tube which has walls of substantially uniform thickness. Thus, by using this apparatus superior inner tubes can be made in which economcial use is made of the materials forming the walls of the tubes.

It is a primary object of this invention to provide an improved form of this apparatus which is extremely simple in construction, and which therefore is cheaper to manufacture and maintain than the apparatus shown in the above-mentioned patent. It is a further object of this invention to provide an apparatus of the above-described type which can be adapted to the manufacture of inner tubes of different sizes by a simple adjustment of the apparatus.

These objects are achieved by mounting a series of spaced conical rollers on a rotatable shaft. The inner tube stock in arcuate form is led upwardly from the die of the extruder to a first of these conical rollers, over this roller and thence helically over the other rollers on the shaft where the stock is cooled. Between adjacent rollers the stock is draped in arcuate loops beneath the shaft so that the stock maintains an arcuate form from the extruder through the cooling apparatus until it is ready to be spliced into annuli. The apparatus is adapted to make inner tubes of different sizes by making the conical rollers variable or adjustable in cone angle.

For a better understanding of these and other characteristics and advantages of this invention, reference should be had to the following description and the accompanying drawing, wherein:

Fig. 1 is a side view of an apparatus for continuously manufacturing inner tubes according to this invention;

Fig. 2 is a detailed view of one of the conical rollers of Fig. 1 showing the manner in which the cone angle of the roller is adjusted and the means by which this adjustment is achieved; and Fig. 3 is a view of a modified construction of a conical roller useful in this invention.

Referring now to the drawings and to Fig. 1 in particular an embodiment of this invention is shown in which an extruder 10 having a die 11 extrudes continuously the inner tube stock T. This stock T has a circular cross section as it emerges from the die 11, but for ease of handling of the stock in the cooling and subsequent operations, it is collapsed after it leaves the die 11 so that it has a cross section resembling a rubber band as shown in the drawing. To prevent the closely spaced walls of the collapsed tube from adhering to each other, the extruder is provided with a means (not shown) in the die 11 for depositing soapstone in the interior of the tube. The extruder is also provided with a means to inflate partially the tube stock as it leaves the die, so that the tube stock maintains its shape and does not wrinkle as it is handled in the cooling operation. Means for performing these functions are well known in the tire industry, and since in their specific nature they form no part of this invention, they need not be described further.

Above the die 11 and substantially aligned with the direction of flow of the stock as it emerges from the die is a shaft 13 which carries a plurality of conical rollers 12 spaced along the length of the shaft. The stock T is led from the die 11 to the first of the rollers 12 which is spaced both longitudinally and vertically from the die 11. The hot raw stock leaves the die 11 in a curved shape as shown in the drawing. From the first conical roller the hot plastic stock T is led helically around the shaft 13 and over the second conical roller 12 to hang in an arcuate loop between the first and second rollers, whereby its arcuate shape is retained, and the stock is cooled partially by a water spray from the nozzles 14. From the second conical roller 12 the stock is similarly led to the succeeding rollers in arcuate form to be thoroughly cooled by the water spray, and then it is subjected to air blasts from the nozzles 15 which remove the cooling water from the stock. A pan 29 having a drain is positioned beneath the rollers 12 to collect and carry off the water from the sprays. At the last of the conical rollers 12, a workman cuts the stock T into appropriate lengths and deposits them on a conveyor 16 which carries the lengths to a splicing stand where they are spliced into annuli.

One end of this shaft 13 is supported in a bracket 17, and the other end is fixed to a speed-reducing and variable speed drive mechanism 19 through which it is driven by a motor 18. The shaft support 17 and the variable speed mechanism 19 may be movable both vertically and longitudinally so that the position of the shaft 13 and hence the conical rollers 12 with respect to the die 11 may be varied to accommodate inner tube stock of different curvature as desired.

To adapt the apparatus further for the manufacture of tube stock of different sizes, the conical rollers 12 are made so that they have a variable cone angle. It will be apparent that as the arcuately shaped stock T travels over the conical rollers 12 the portion thereof which is to form the rim circumference of the inner tube will travel at a smaller linear speed than the portion thereof which is to form the tread circumference. Therefore, if the roller 12 is to transport the stock T in arcuate condition without wrinkling the stock, that part of the roller which supports the rim circumference must travel at a lesser linear speed than that part which supports the tread circumference. For this reason a roller having a conical surface is selected to transport the inner tube stock T through the drying apparatus. It will be apparent further that if the radius of curvature of the arc of the stock is changed, the ratio of the linear speeds of the rim and tread circumferences about the rollers will also be changed. If the rollers are to transport stock of different radii without wrinkling the stock, the ratio of the speeds of the surfaces at two points spaced a fixed distance must be variable. This can be achieved by making the rollers having a variable cone angle.

Referring now to Figs. 1 and 2, the rollers 12 are shown having the shape of a frustum of a cone and consisting of the T-shaped slats 20 pivoted at 21 on the collar 22 which is welded to the shaft 13. Struts 23 are pivoted at one end to the slats 20 and at the other to the collar 24 which is slidable on shaft 13, and thereby serves to increase or decrease the cone angle of the conical surface of the roller 12. The collars 24 of the several rollers 12 are fixed to the shaft 25 which may be moved longitudinally of the shaft and fixed in any desired position by means of the threaded bolt 26 passing therethrough and adapted to screw into the threaded calibrated holes in the block 27 fixed to the shaft 13. By moving the rod 25 longitudinally of the shaft 13, the cone angle of the rollers 12 may be varied, and in this manner the ratio between the linear speeds of any two points on the surface of the cone may be varied; hence the cones 12 may be adapted to make inner tubes for tires of various sizes. When a particular size tube is to be made it is only necessary to set the bolt 26 in the proper opening in the block 27.

Referring now to Fig. 3 there is shown a modified form of conical roller 12' which may be substituted for the adjustable conical roller 12 shown in Figs. 1 and 2. This roller 12', instead of an adjustable conical surface, has a rigid surface which has a continuously varying cone angle. The effective cone angle for this conical roller will depend on how far up or down on the cone the stock rides. Inasmuch as the position of the stock on the cone is determined automatically by the conveyor in such a way that the linear speed of the conical roller at the point of contact with the stock is equal to the linear speed of the stock as it comes from the tuber, the position of the stock on the conical roller can be adjusted as desired by a precise adjustment of the angular velocity of the cone shaft. This speed adjustment of the conical roller 12' may be effected by the variable speed device 19 shown in Fig. 1.

It will be apparent from the foregoing that I have invented an extremely simple and efficient apparatus for manufacturing inner tubes in which the rollers which transport the stock through the drying apparatus may be mounted on a single shaft to be driven simply and efficiently from a single driving mechanism. Since the rollers are all mounted on a single shaft, the apparatus may be made more rugged, and the apparatus may be maintained easily. Furthermore, by aligning the rollers, the adaptation of the device to making inner tubes of different sizes is greatly simplified.

Having thus described my invention, what I claim and desire to protect by Letters Patent is:

1. In apparatus for continuously manufacturing inner tubes by means of an extruder having a die for extruding inner tube stock, the combination which comprises a first conical roller disposed upwardly from said die for transporting said stock from said extruder, a shaft to which said first roller is fixed, additional conical rollers fixed to and spaced along said shaft whereby said stock may be draped in arcs between adjacent rollers, said conical rollers being so constructed that the cone angle of the surfaces thereof may be adjusted whereby said apparatus may be adapted to receive tube stock of various sizes, and means for rotating said shaft, whereby said stock may be transported continuously from said extruder without distortion.

2. Apparatus for continuously manufacturing inner tubes, comprising an extruder having a die for extruding inner tube stock, a first conical roller disposed upwardly from said die for transporting said stock from said extruder, a plurality of additional spaced conical rollers substantially aligned axially with and spaced from said first roller, said rollers being disposed with their surfaces tapering in a common direction whereby said stock may be led over said first roller and said additional rollers in arcuate form and draped between adjacent rollers in arcuate form, whereby said stock may be led continuously from said extruder without distortion.

3. Apparatus for continuously manufacturing inner tubes, comprising an extruder having a die for extruding inner tube stock, a conical roller disposed upwardly from said die for transporting said stock from said extruder, a plurality of spaced rollers substantially aligned axially with said conical roller so that the stock may be led from said conical roller to said additional rollers and draped between adjacent rollers in arcuate form, and means for driving said rollers, whereby said stock is transported continuously from said extruder in arcuate form without distortion.

4. Apparatus for continuously manufacturing inner tubes, comprising an extruder having a die for extruding inner tube stock, a first conical roller disposed upwardly from said die for transporting said stock from said extruder by a shaft for driving said first roller, additional conical rollers fixed to and spaced along said shaft whereby said stock may be draped in arcs between adjacent rollers, said additional conical rollers being constructed with their surfaces having a graduated cone angle whereby said apparatus may be adapted to receive tube stock of various sizes, and means for rotating said shaft, whereby said stock may be transported continuously from said extruder without distortion.

5. Apparatus for continuously transporting inner tube stock from an extruder having a die for extruding the stock, which comprises a first conical roller disposed upwardly from said die for transporting said stock from the extruder, a shaft for said roller, a plurality of additional conical rollers on said shaft spaced from said first roller and aligned axially, said rollers being disposed with their surfaces tapering in a common direction whereby said stock may be led over said first roller and said additional rollers in arcuate form and draped between adjacent rollers in arcuate form, whereby said stock may be led continuously from said extruder without distortion.

6. Apparatus for continuously transporting inner tube stock from an extruder having a die for extruding the tube stock, which comprises a rotatable shaft, a plurality of axially aligned conical rollers affixed to and spaced along said shaft with their surfaces tapering in a common direction whereby said stock may be led helically over said rollers to hang in arcs between adjacent rollers, and means for driving said shaft, whereby said stock may be transported continuously from said extruder in arcuate form without distortion.

References Cited in the file of this patent

UNITED STATES PATENTS

| | | |
|---|---|---|
| 1,244,258 | Thompson | Oct. 23, 1917 |
| 1,643,999 | Semple | Oct. 4, 1927 |
| 2,070,252 | Borner | Feb. 9, 1937 |
| 2,246,236 | Becker | June 17, 1941 |
| 2,423,147 | Hinman | July 1, 1947 |
| 2,613,392 | Ternes | Oct. 14, 1952 |